UNITED STATES PATENT OFFICE.

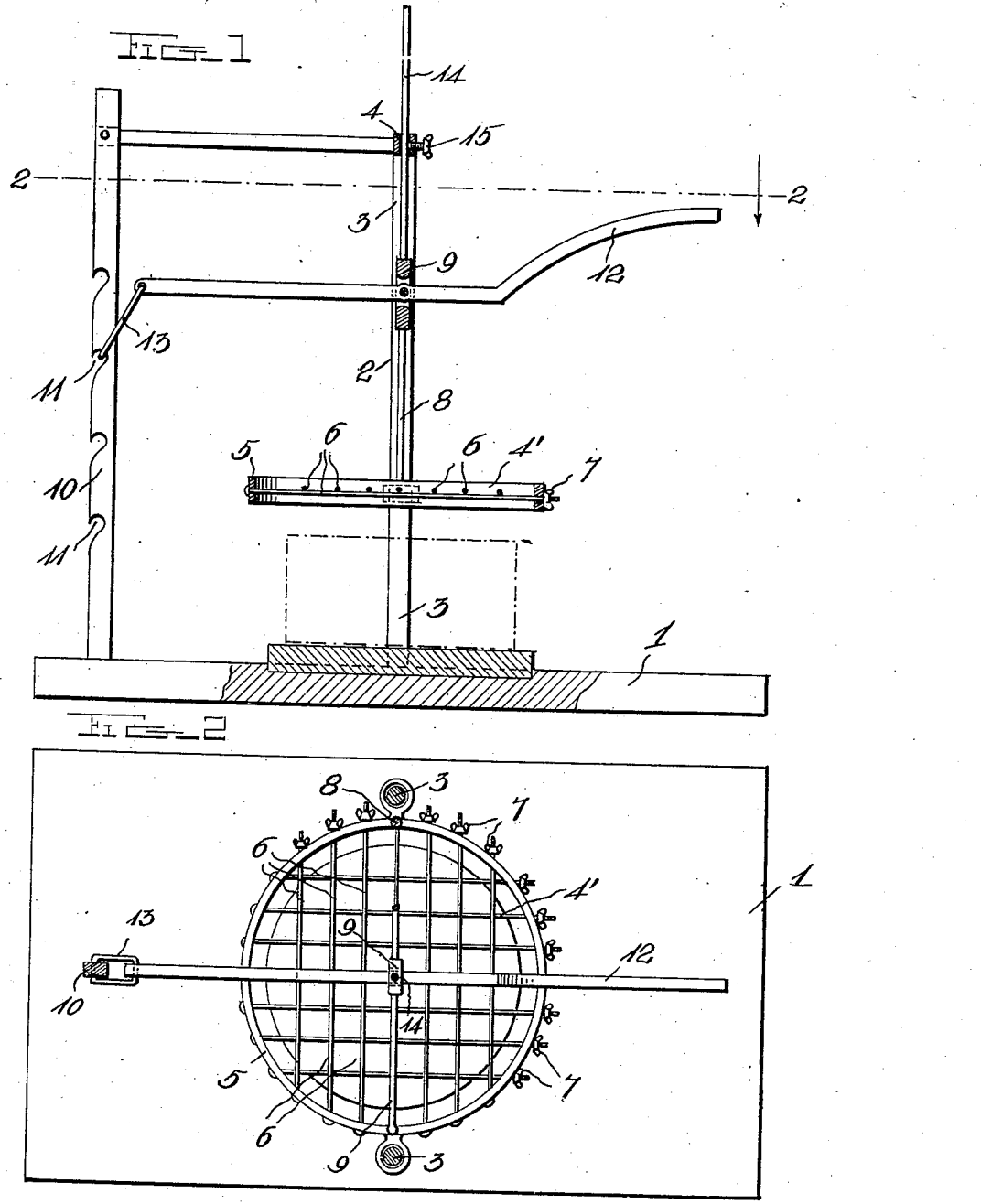

FERDINAND J. ZIEGLER, OF BERRYTON, KANSAS.

BUTTER-CUTTING MACHINE.

No. 883,847.  Specification of Letters Patent.  Patented April 7, 1908.

Application filed January 6, 1908. Serial No. 409,572.

*To all whom it may concern:*

Be it known that I, FERDINAND J. ZIEGLER, a citizen of the United States, residing at Berryton, in the county of Shawnee and State of Kansas, have invented certain new and useful Improvements in Butter-Cutting Machines; and I do declare the following to be a full, clear, and exact description of the invention, such as will enable others skilled in the art to which it appertains to make and use the same.

This invention relates to new and useful improvements in butter cutting machines, and has for its principal object the production of a simple and efficiently operating device of this kind whereby butter may be cut into pound prints.

With the foregoing and other objects in view, that will readily appear as the nature of the invention is better understood; the same resides in the novel features of construction, combination, and arrangement of parts, illustrated in the drawings and particularly pointed out in the appended claims.

In the accompanying drawings:—Figure 1 is a central, vertical, longitudinal sectional view of a device constructed in accordance with the invention; and Fig. 2 a horizontal section taken on a plane indicated by the dotted lines 2—2, Fig. 1.

Referring to the drawings, which are for illustrative purposes only, and therefore, are not drawn to scale, the numeral 1 indicates a suitable base, and 2 an upright guide frame comprising upright side pieces 3 and top cross piece 4.

The numeral 4' indicates the butter-cutting member for cutting the mass of butter into pound, or other size prints, said member comprising an annulus 5, between which is arranged cutting wires 6, one series of the latter being arranged to cross the other series at right angles forming squares for determining the size of the prints into which the butter is to be cut. Keys or tension adjusting nuts 7, are arranged at the ends of the cutting wires whereby the latter may be stretched to the desired tension.

In carrying out the invention, a suitable carriage comprising side members 8, and an upper cross piece, 9, is connected with the cutting member, suitable laterally extending guide loops being formed at the lower ends of the side members 8 to fit and slide on the upright members 3 of the guide frame 2. A standard 10 formed with a plurality of longitudinally spaced notches 11 is mounted on the base in rear of the butter-cutting member and carriage, the purpose of which will be disclosed. An operating lever 12 is pivoted intermediately of its end to the cross piece, 9, of the carriage and has pivoted to its extreme inner end a connecting link 13, designed to engage in either of the notches 11 formed in the standard.

An upright guide stem 14 extends from the cross piece 9, of the carriage and is designed to work in an opening formed in the cross piece 4 of the upright guide frame 2, said stem being adapted to be engaged by a set-screw 15, screwing through the cross piece 4 of the guide frame 2, whereby the carriage and cutting member may be held in an elevated or inoperative position.

In practice, the butter-cutting member and carriage are held in an elevated or inoperative position by the set-screw 15, while the mass of butter to be cut into prints is being placed under the cutting member, the links 13, being engaged in one of the notches 11 of the upright 10. The butter having been placed in position, the operator grasps the free end of the upright lever 12 and pulls down on said end, to cause the descension of the cutting member, by which operation, the mass of butter is cut into prints by the cutting wires of the cutting member.

From the foregoing description taken in connection with the drawings, it is thought that the construction and operation of the invention will be understood without requiring a more extended explanation.

Having described the invention, what I claim as new and desire to secure by Letters-Patent is:—

1. A device of the character described embracing a base, an upright guide frame fixedly mounted thereon, a standard formed in its rear side edge with a series of vertically spaced upwardly inclined notches fixedly mounted on the base in rear of the guide frame, a carriage mounted in the guide frame, a vertically adjustable operating lever pivoted to the carriage, the pivot end of the lever extending to a point adjacent to the standard, a connecting link pivoted to the pivot end of the lever, said link being adapted to engage with either of the notches of the standard when the pivot end of the lever is in a horizontal or upwardly inclined position and adapted to be disengaged from the adjacent notch to permit readjustment of the lever and carriage by slightly raising the free or handle end of the former.

2. A device of the character specified, embracing a base, an upright guide frame comprising an upper cross-piece, fixedly mounted thereon, a cutting member, a carriage connected with the cutting member, and carriage supporting means for supporting the carriage at any desired ajustment above the base, said means comprising an upright guide stem fixed to the carriage in position to pass through the upper cross-piece of the guide frame, and a set screw screwing through said cross-piece in position to engage the stem, with operating means for the carriage.

3. A butter cutting machine comprising a base, an upright guide frame consisting of side pieces connected by an upper cross-piece fixedly mounted thereon, a butter cutting member, a carriage comprising side pieces, the lower ends of the side pieces being formed with laterally extending guide loops to receive the side pieces of the guide frame, and supporting means for supporting the carriage at any desired adjustment above the base, said means embracing an upright guide stem fixed to the carriage in position to pass through the cross-piece of the guide frame, and a set screw screwing through the base in position to engage said stem.

In testimony whereof I have hereunto set my hand in presence of two subscribing witnesses.

FERDINAND J. ZIEGLER.

Witnesses:
 C. W. HAVEKOTT,
 W. H. DEITS.